United States Patent [19]
Arai

[11] Patent Number: 5,476,357
[45] Date of Patent: Dec. 19, 1995

[54] MICROMANIPULATOR

[75] Inventor: Tatsuo Arai, Tsukuba, Japan

[73] Assignees: Agency of Industrial Science and Technology; Ministry of International Trade and Industry, both of Tokyo, Japan

[21] Appl. No.: 217,870

[22] Filed: Mar. 25, 1994

[30] Foreign Application Priority Data

May 21, 1993 [JP] Japan .................. 5-142716

[51] Int. Cl.⁶ .................................................. B25J 17/02
[52] U.S. Cl. .................... 414/729; 74/490.09; 901/28; 901/29; 294/106
[58] Field of Search ...................... 414/729, 733, 414/738; 901/22, 23, 24, 28, 29; 74/479 BJ, 479 BW, 479 BP, 479 PH, 490.05, 490.06, 490.03, 490.09; 188/378, 321.11; 310/317, 318, 328; 294/106

[56] References Cited

U.S. PATENT DOCUMENTS

| | | | |
|---|---|---|---|
| 4,819,496 | 4/1989 | Shelef . | |
| 5,052,736 | 10/1991 | Loncaric et al. . | |
| 5,209,326 | 5/1993 | Harper | 188/378 |
| 5,348,124 | 9/1994 | Harper | 188/378 |
| 5,354,158 | 10/1994 | Sheldon et al. | 901/23 X |

FOREIGN PATENT DOCUMENTS

| | | | |
|---|---|---|---|
| 2529333 | 12/1983 | France . | |
| 2549916 | 2/1985 | France . | |
| 1171307 | 8/1985 | U.S.S.R. | 395/88 |

OTHER PUBLICATIONS

Mechatronics, vol. 1, No. 4, 1991, R. Andrew Russell, "An Adroit Gripper for Tactile Sensor Research", pp. 457–467.
Proceedings IEEE International Conference on Robotics and Automation, vol. 1, May 3, 1993, Kenneth W. Grace, et al., "A Six Degree of Freedom Micromanipulator for Ophthalmic Surgery", pp. 630–635.

Primary Examiner—Donald W. Underwood
Attorney, Agent, or Firm—Oblon, Spivak, McClelland, Maier, & Neustadt

[57] ABSTRACT

A micromanipulator comprises a pair of hand modules each of which includes a circular base plate with three connection points, an end-effector consisting of a circular moving plate and a finger attached to the moving plate, the moving plate being disposed above the base plate and having three connection points offset 60 degrees from those of the base plate, six metal links disposed between the base plate and the moving plate, six actuators provided on the six metal links for extending and contracting them, six first metal wire members connected between one end of the six metal links and the three connection points of the base plate so that two wire members are connected with each connection point of the base plate to be inclined in opposite directions, and six second metal wire members connected between the other end of the metal links and the three connection points of the moving plate so that two wire members are connected with each connection point of the moving plate to be inclined in opposite directions.

2 Claims, 3 Drawing Sheets

MICROMANIPULATOR

BACKGROUND OF THE INVENTION

1. Field of the Invention

This invention relates to a micromanipulator adapted for use in fields requiring precise positioning on the μm order, particularly for use in the integrated circuit (IC) industry (for precision wafer positioning), bioengineering, medicine (microsurgery), satellite communications (precise antenna positioning) etc.

2. Description of the Prior Art

Micromanipulation is the technology of conducting operations on minute objects (for example, cells) with sizes on the order of several tens of μm. It can be effectively applied, for instance, for grasping a minute object with two fingers and positioning it by translational and rotational motion, as well as for operations such as gripping, pressing, cutting, stretching, compressing, perforating, mixing and propelling. As such, it has become an indispensable technology in a wide range of fields including biotechnology and medicine. However, since most of the micromanipulators that have become commercially, available up to the present consist of a combination of a mechanism for translational motion in three mutually perpendicular directions and a gripper, they are not optimally adapted for use with microscopic objects.

In view of these circumstances and in light of the fact that in the microworld surface forces are dominant over inertial force, the inventor concluded that a two-finger microhand would be capable of sufficiently stable micromanipulation. He therefore developed a two-finger hand with a drive mechanism utilizing parallel linkages with six degrees of freedom (DOF). This micromanipulator, which is described in Japanese Patent Application Hei 3(1991)-305,220, was confirmed to be highly effective as regards operability, controllability and the like.

This earlier proposed micromanipulator is constituted as a two-finger hand employing a pair of hand modules with 6-DOF parallel linkages. Each hand module has a base plate and an end-effector consisting of a moving plate and a finger attached to the moving plate. The base plate and the moving plate are connected by six links that are extended and contracted by piezoelectric actuators. The six links are divided into two groups of three each. The links of both groups are connected with the base plate and the moving plate at points spaced along circles whose centers are the axial centers of the plates, but the links of one group are inclined in the opposite direction from those of the other group. Since the need for the micromanipulator to be compact makes it difficult to use ball joints or the like for connecting the links with the base plate and the moving plate, the connection is made by pivots and springs connected between the base plate and the moving plate for retaining the links in a squeezed state between the base and moving plates.

Although this configuration is highly effective from the viewpoint of reducing the size of the micromanipulator, various tests conducted on a prototype configured in line with this design revealed shortcomings. First, since the links are held between the base plate and the moving plate of the end-effector by spring force, the micromanipulator is liable to break down structurally when exposed to an external force exceeding the spring force. Second, since the springs constitute a vibration system, the micromanipulator cannot be used in the natural frequency range of the vibration system determined by the spring constant and the mass of the vibrating members and is further unable to follow rapid movements with adequate response. From the test results it was concluded that configurational improvements for coping with these problems would enable realization of a practical micromanipulator.

The present invention was achieved in light of the foregoing findings and has as its object to provide a micromanipulator which is strong enough not to structurally break down easily under external force and which, not having a spring vibration system, is able to follow rapid movements with good response.

SUMMARY OF THE INVENTION

The invention achieves this object by providing a micromanipulator constituted of a pair of hand modules each comprising:

a circular base plate provided along its edge with three substantially equally spaced connection points, an end-effector consisting of a circular moving plate and a finger attached to the moving plate, the moving plate being disposed above the base plate and being provided along its edge with three substantially equally spaced connection points offset about 60 degrees from the connection points of the base plate, six metal links disposed between the base plate and the moving plate, six actuators provided one on each of the six metal links for extending and contracting the metal links, six flexible first metal wire members each connected between one end of one of the six metal links and one of the three connection points of the base plate, two first metal wire members being connected with each connection point of the base plate to be inclined in different directions from each other, and six flexible second metal wire members each connected between the other end of one of the six metal links and one of the three connection points of the moving plate, two second metal wire members being connected with each connection point of the moving plate to be inclined in different directions from each other.

When selected links of the hand modules of the so-configured micromanipulator are extended/contracted by operating the associated actuators, the positions and directions of the end-effectors are controlled with six degrees of freedom according to the amount of link contraction, whereby the fingers of the micromanipulator can be caused to execute prescribed motions.

Further, since the connection of the links with the base plate and the end-effector is made at the connection points by direct coupling using flexible metal wire members, the micromanipulator is strong enough not to structurally break down easily under external force and, moreover, since it has no spring vibration system, the micromanipulator is able to follow rapid movements with good response. The characteristics of the micromanipulator are thus markedly improved over those of the prior art micromanipulators.

The above and other features of the present invention will become apparent from the following description made with reference to the drawings.

DESCRIPTION OF THE PREFERRED EMBODIMENT

Figure 1:
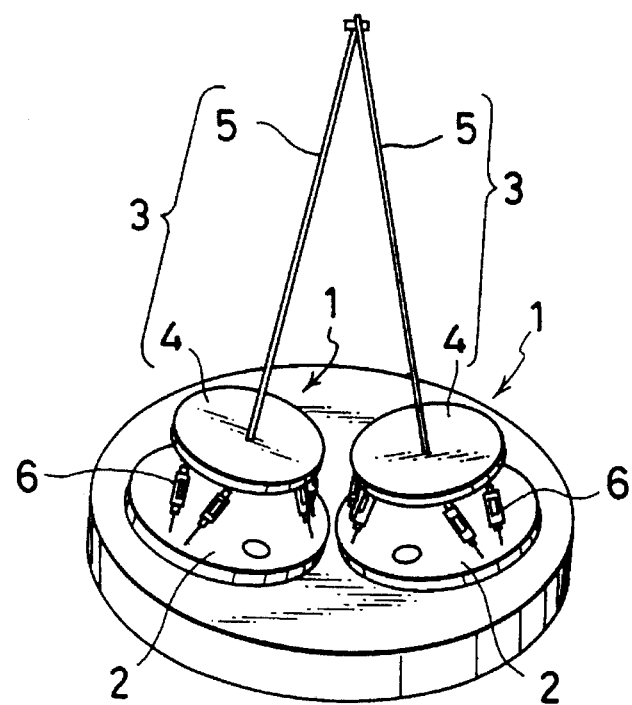
FIG. 1 is a perspective view showing the overall configuration of the micromanipulator according to the present invention.
Figure 2:
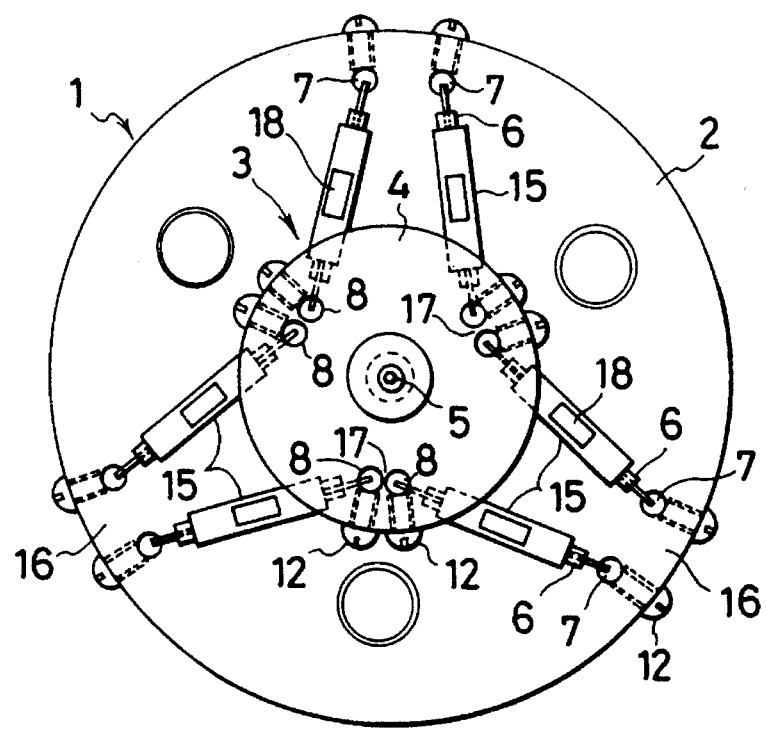
FIG. 2 is a plan view showing the configuration of a hand module of the micromanipulator of FIG. 1.
Figure 3:
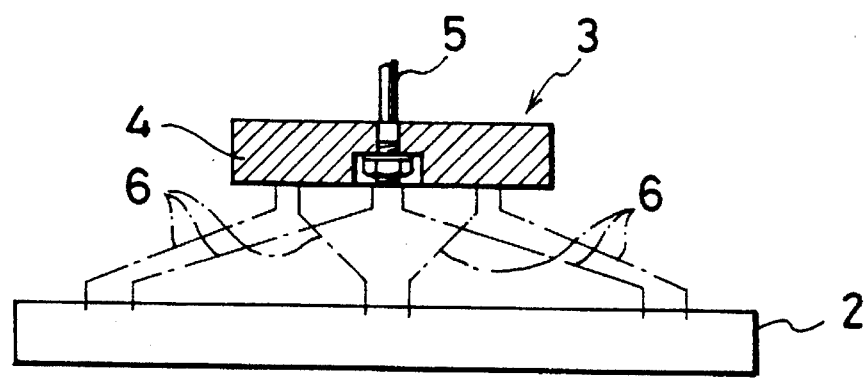
FIG. 3 is a side view, partially broken away, showing the configuration of an essential portion of the hand module of FIG. 2.

The overall configuration of an embodiment of the micromanipulator according to the invention is shown in FIG. 1, and the configuration of the essential portion of the hand modules 1 constituting the manipulator is shown in FIGS. 2 and 3.

As shown in FIG. 1, the micromanipulator is constituted as a two-figure microhand consisting of two hand modules. In order to realize a precision mechanism with multiple degrees of freedom, the hand modules 1 are equipped with parallel linkages with six degrees of freedom, as shown in FIGS. 2 and 3. Each hand module 1 consists mainly of a circular base plate 2, an end-effector 3 constituted of a circular moving plate 4 of smaller diameter than the base plate 2 and a finger 5 attached to the moving plate 4, and six links 6 that interconnect the base plate 2 and the moving plate 4.

More specifically, as shown in FIG. 2, the base plate 2 is provided along its edge with three substantially equally spaced connection points 16 for the links 6, and the moving plate 4 is provided along its edge with three substantially equally spaced connection points 17 offset about 60 degrees from the connection points 16 of the base plate.

Figure 4:
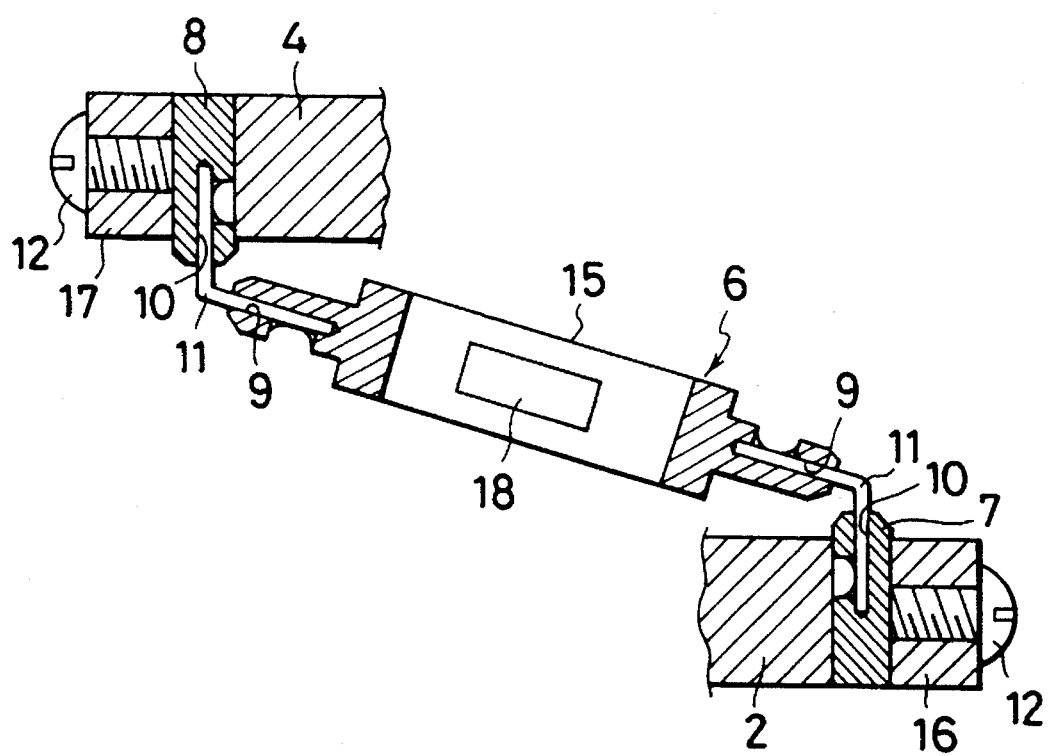
FIG. 4 is a sectional view showing how the links of a hand module are connected.

FIG. 4 shows a specific example of means for connecting the links 6 with the connection points 16, 17. As illustrated, one end of a bent flexible metal wire member 11 is bonded in a hole 9 at either end of each link 6. The other end of the flexible metal wire member 11 at one end of the link 6 is bonded in a hole 10 of a fastener pin 7 for attachment to the base plate 2 and the other end of the flexible metal wire member 11 at the other end of the link 6 is bonded in a hole 10 of a fastener pin 8 for attachment to the moving plate 4. Two holes for anchoring two fastener pins 7 are formed at each connection point 16 of the base plate 2 and two holes for anchoring two fastener pin 8 are formed at each connection point 17 of the moving plate 4. The fastener pins 7, 8 are inserted into the holes formed at the connection points of the base plate 2 and the moving plate 4 so that at each connection point the associated two links 6 are inclined in different directions. The fastener pins 7, 8 are fixed in the holes by screws 12. As a result, the base plate 2 and the moving plate 4 are connected in parallel by the pairs of flexible metal wire members 11 via the links 6.

Since the actuators (the piezoelectric elements 15 described later) provided on the links extend/contract only by about 1/1000 of their length, the flexible metal wire members 11 bend only to a very small extent. The material selected for the metal wire members therefore does not have to be one capable of large bending but needs only to be a material whose strength against exterior forces is sufficient for ensuring the strength of the manipulator. An example of a material meeting this description is steel wire.

The micromanipulator using the aforesaid parallel linkage has to be capable of positioning with multiple degrees of freedom. To this end, each of the six links 6 is equipped with an actuator consisting of a stacked piezoelectric element 15 by which it can be extended and contracted.

While the stacked piezoelectric elements 15 used for precise positioning exhibit rapid response, fine displacement and high output, their very large hysteresis makes it impossible to attain accurate positioning only by open-loop control of the drive voltage. It is therefore preferable to use feedback control based on measured displacement. For this, it is necessary to provide the micromanipulator with compact displacement measurement means and a servo drive system.

For measuring the position and attitude of the end-effector 3 as required in this type of drive control, a strain gage 18 is directly bonded on the side of each stacked piezoelectric element 15 to extend in the direction of its elongation. The small displacements measured by the strain gages 18 are fed back and compared with the end-effector 3 position and attitude command values and, based on the results of the comparison, outputs for precision servo positioning control are forwarded to the piezoelectric element 15 drivers.

The servo system for the drive control of the piezoelectric elements 15 may, for example, be a software servo system using a computer or an analog servo system employing operational amplifiers.

Figure 5:
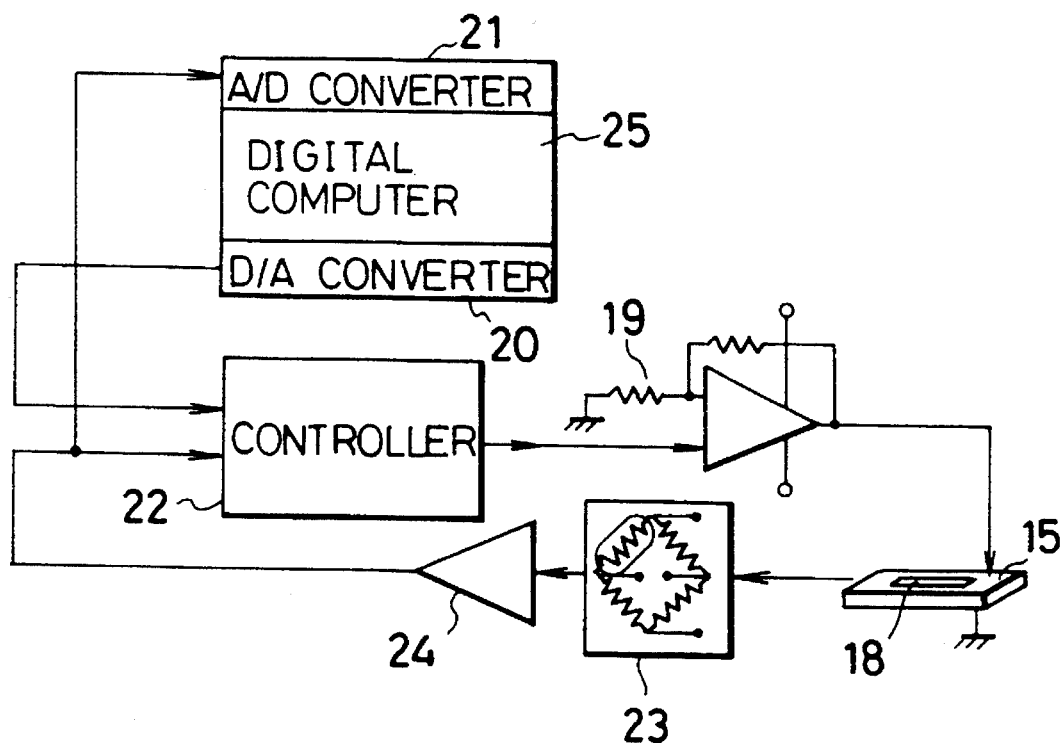
FIG. 5 is a block diagram of a micromanipulator control system.

FIG. 5 shows an example of the micromanipulator control system. In the illustrated system, a drive signal for the piezoelectric element 15 is output by a D/A converter 20 to an analog servo controller 22 which corrects the drive signal for the deviation of the link displacement from the set value determined on the basis of a signal fed back from the strain gage 18 via a gage bridge 23 and an instrument amplifier 24 and the corrected drive signal is sent to the piezoelectric elements 15 through a driver 19 constituted as a noninverting amplifier employing a high-voltage operational amplifier. Actual link displacements are sent to an A/D converter 21 to be monitored in the digital computer 25.

Tests conducted using a software servo showed that precision and response speed adequate for the actuators of the hand modules could be achieved with a relatively simple drive control system.

High response speed can be achieved by basing the analog servo configuration on a PID controller.

By selectively driving the piezoelectric elements 15 of the micromanipulator constituted in the foregoing manner so as to extend/contract the links 6, the position and direction of the end-effector 3 can be controlled with six degrees of freedom in accordance with the amount of extension/contraction of the individual links. The micromanipulator can therefore be operated to execute desired motions by selective extension/contraction of the links 6.

The micromanipulator according to the invention was fabricated using hand modules with a base plate 2 about 35 mm in diameter, a moving plate 4 about 20 mm in diameter, a spacing between the base plate and the moving plate of about 6 mm, 2×3×10 mm piezoelectric elements 15, a maximum displacement of 8 μm, a finger about 50 mm in length, links about 23 mm in length (including the piezoelectric elements), and metal wire members 11 made of steel wire measuring 0.5 mm in diameter. The motion of the tips of the fingers could be precisely controlled for manipulating minute objects on the several μm order to conduct such operations as gripping, positioning, cutting, stretching, mixing and the like.

The micromanipulator according to this invention achieves an improvement on the micromanipulation characteristics of prior art micromanipulators without sacrificing compactness. Being constituted as a two-finger micromanipulator utilizing a pair of hand modules comprising parallel linkages with six degrees of freedom, it is strong enough not to structurally break down easily under external force and, having no spring vibration system, is able to follow rapid movements with good response.

Obviously, numerous modifications and variations of the present invention are possible in light of the above teachings. It is therefore to be understood that within the scope of the appended claims, the invention may be practiced otherwise than as specifically described herein.

Japanese Patent Application No. 5-142716 filed May 21, 1993 is hereby incorporated by reference.

What is claimed is:

1. A micromanipulator comprising a pair of hand modules each comprising:

a circular base plate provided along its edge with three substantially equally spaced connection points, an end-effector consisting of a circular moving plate and a finger attached to the moving plate, the moving plate being disposed above the base plate and being provided along its edge with three substantially equally spaced connection points offset about 60 degrees from the connection points of the base plate, six metal links disposed between the base plate and the moving plate, six piezoelectric elements provided one on each of the six metal links for extending and contracting the metal links, six flexible first metalwire members each connected between one end of one of the six metal links and one of the three connection points of the base plate, two first metal wire members being connected with each connection point of the base plate to be inclined in different directions from each other, and six flexible second metal wire members each connected between the other end of one of the six metal links and one of the three connection points of the moving plate, two second metal wire members being connected with each connection point of the moving plate to be inclined in different directions from each other.

2. A micromanipulator according to claim 1, further comprising strain gages bonded one on the side of each actuator to extend in the direction of its extension/contraction, the detection values from the strain gages being fed back for correcting drive signals supplied to the actuators.

* * * * *

UNITED STATES PATENT AND TRADEMARK OFFICE
CERTIFICATE OF CORRECTION

PATENT NO. : 5,476,357
DATED : December 19, 1995
INVENTOR(S) : Tatsuo ARAI

It is certified that error appears in the above-indentified patent and that said Letters Patent is hereby corrected as shown below:

On the title page, Item [73], the assignee, should read: --Agency of Industrial Science and Technology, Ministry of International Trade and Industry, Tokyo, Japan --

Signed and Sealed this

Second Day of April, 1996

Attest:

BRUCE LEHMAN

*Attesting Officer*     *Commissioner of Patents and Trademarks*